Dec. 3, 1963  A. N. ADDIE  3,112,607
TURBOCHARGED FREE PISTON POWER PACKAGE UNIT
Filed May 17, 1961  7 Sheets-Sheet 1

INVENTOR.
Albert N. Addie
BY
ATTORNEY

Dec. 3, 1963    A. N. ADDIE    3,112,607
TURBOCHARGED FREE PISTON POWER PACKAGE UNIT
Filed May 17, 1961    7 Sheets-Sheet 3

INVENTOR.
Albert N. Addie
BY
D. D. McGraw
ATTORNEY

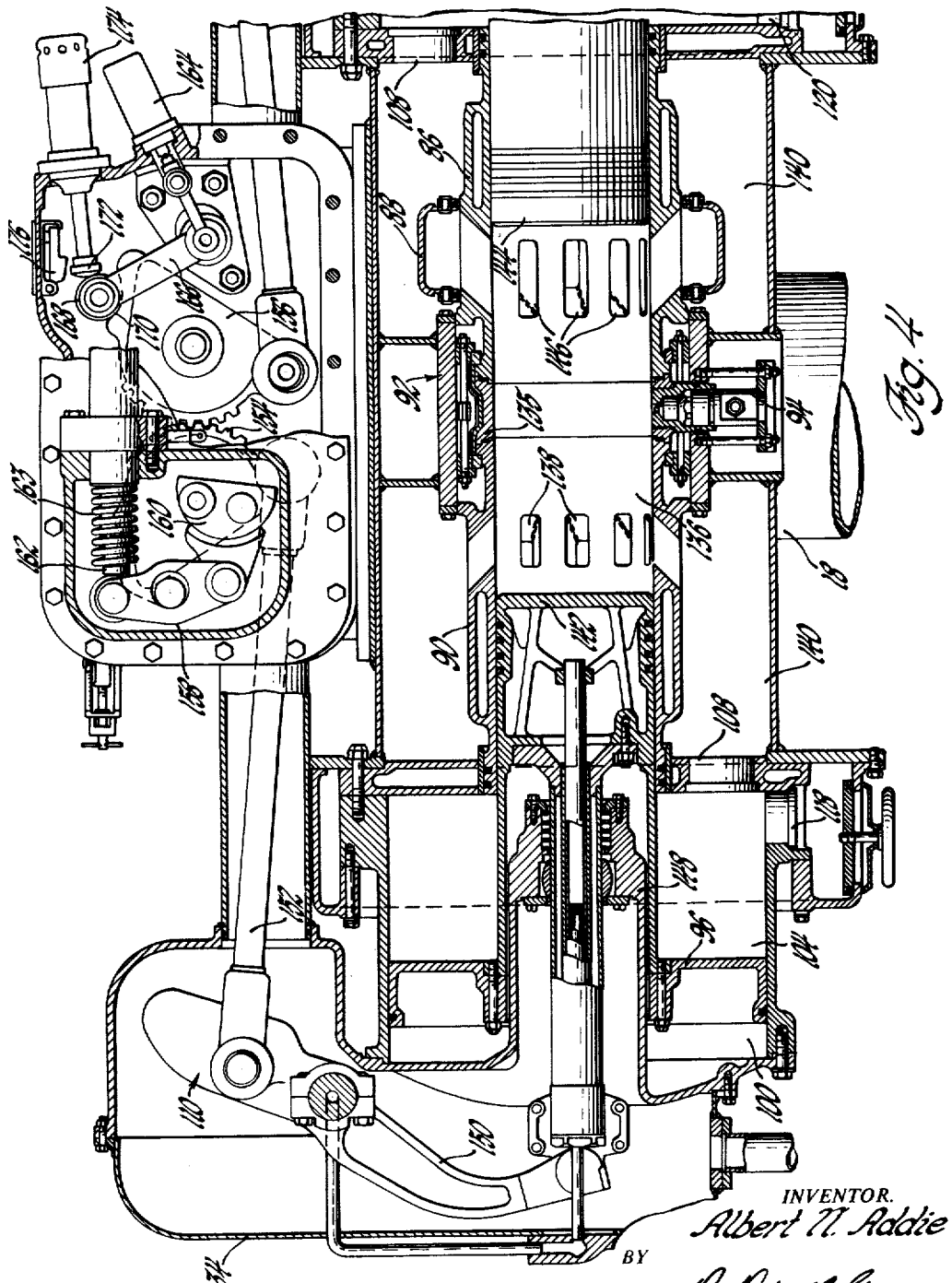

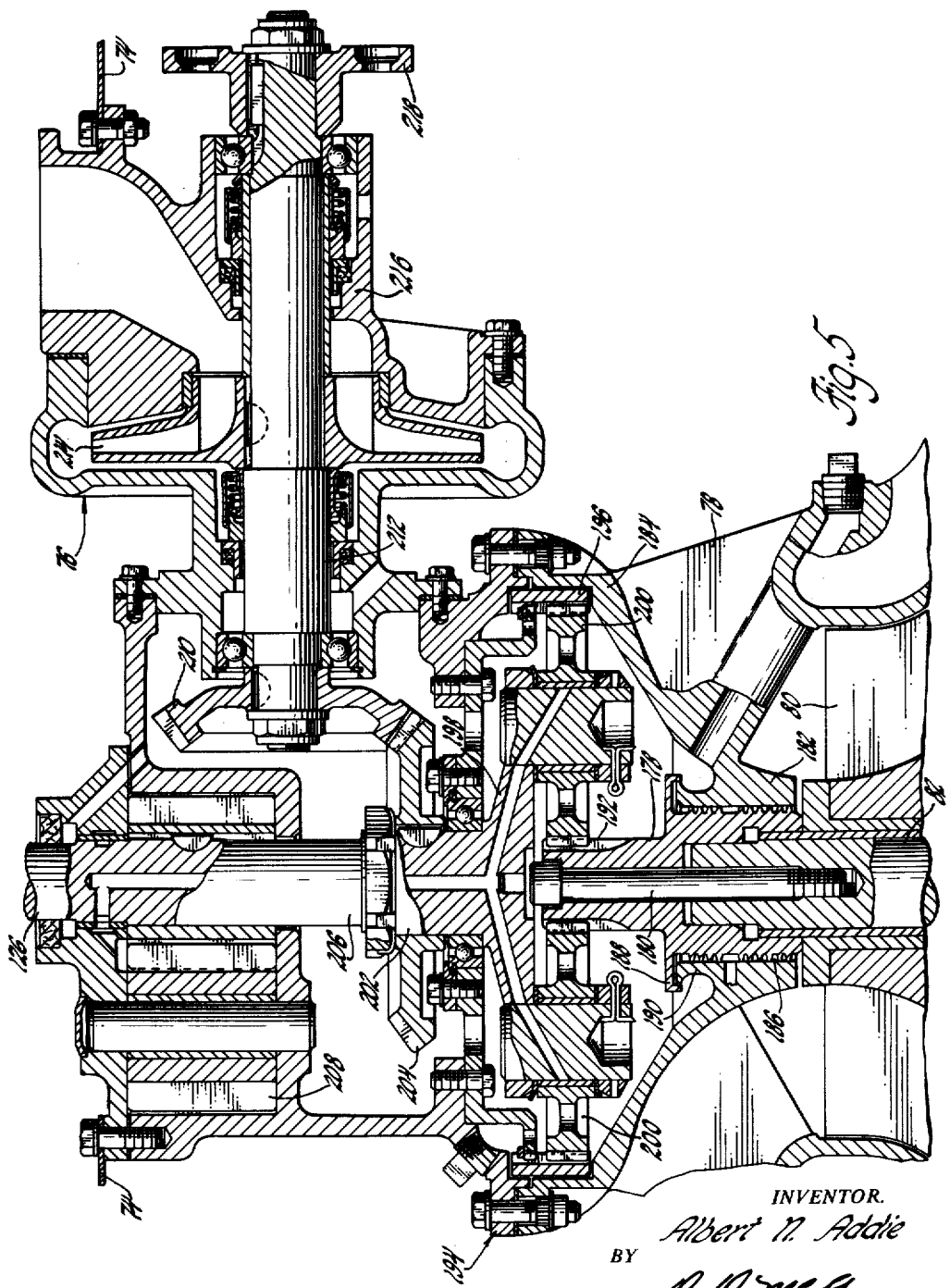

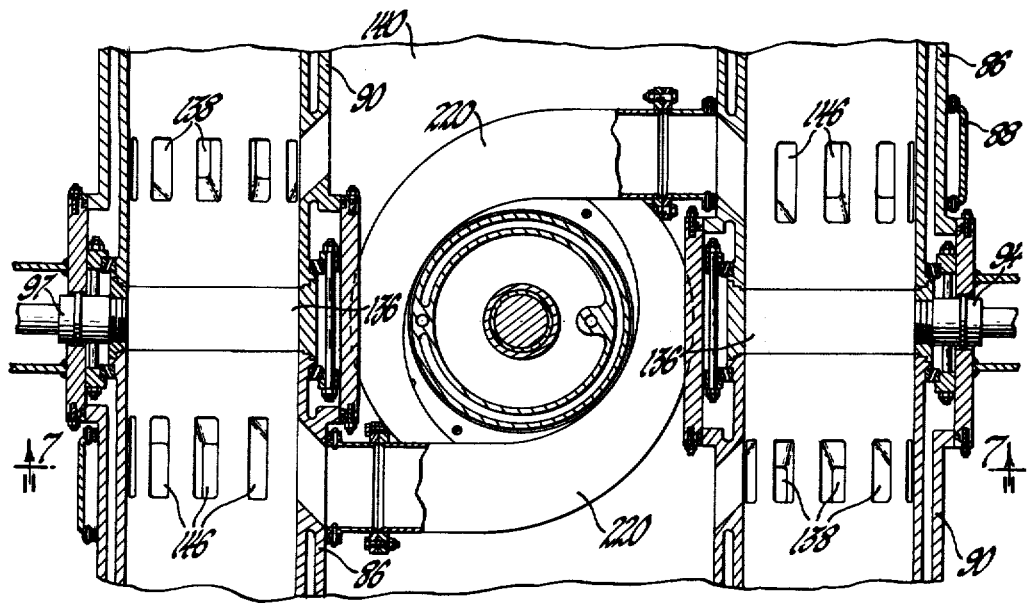

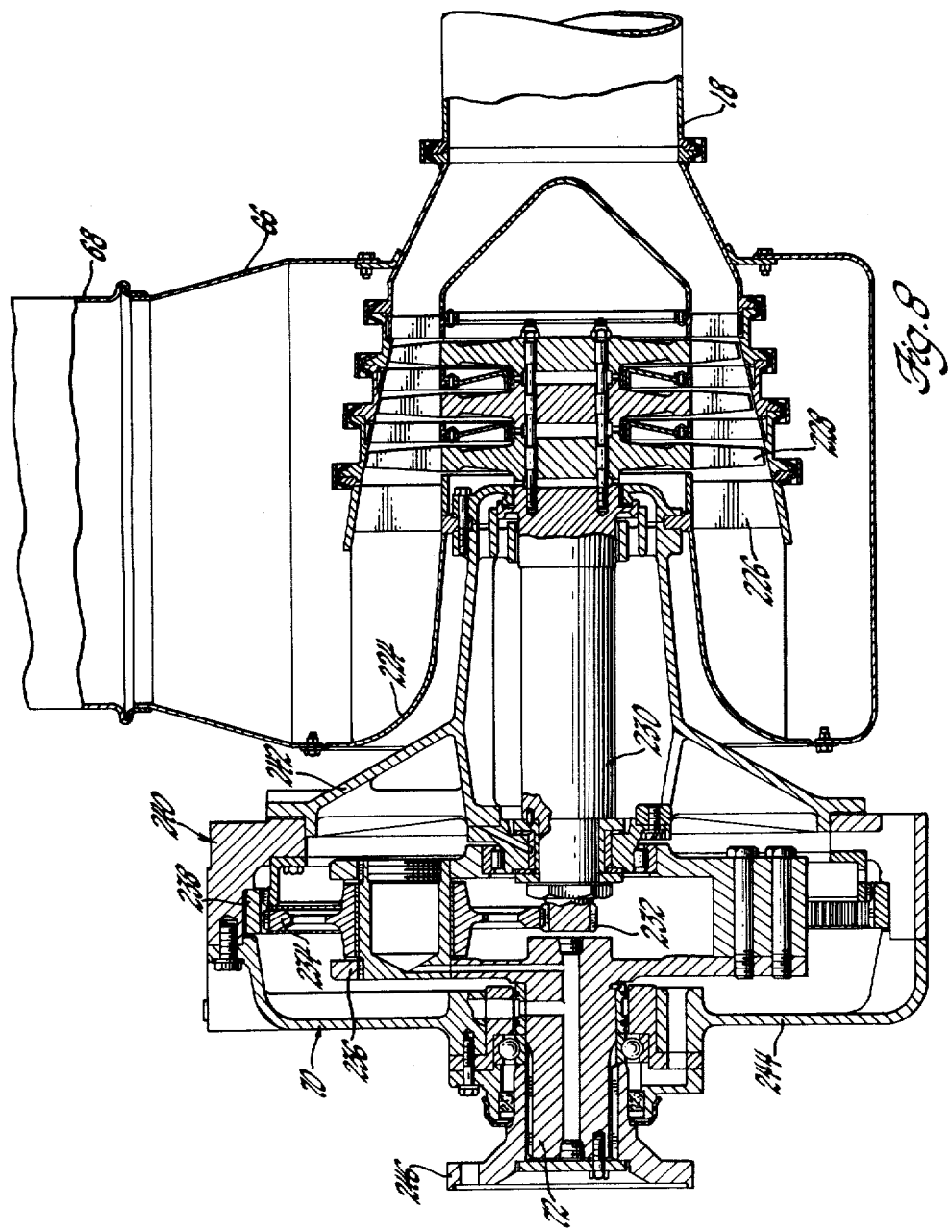

United States Patent Office 3,112,607
Patented Dec. 3, 1963

3,112,607
TURBOCHARGED FREE PISTON POWER
PACKAGE UNIT
Albert N. Addie, La Grange Park, Ill., assignor to General Motors Corporation, Detroit, Mich., a corporation of Delaware
Filed May 17, 1961, Ser. No. 110,773
5 Claims. (Cl. 60—13)

The invention relates to a free piston engine power package having a power turbine for supplying air thereto and a turboconverter for delivery of the engine power to a mechanism to be driven.

Free piston gasifiers, in combination with turbine drives, have attractive characteristics for vehicle propulsion because of the torque conversion ability. Furthermore, the relative insensitiveness to fuel types is of importance. In the past, power package units of this type have had a high specific weight, specific power and a specific fuel consumption when compared to turbocharged diesel engines, particularly in the 200 to 2000 horsepower range. The power package unit embodying the invention permits a free piston gasifier engine to compete favorably with turbocharged diesel engines.

The unit includes an inward compressing siamesed free piston machine supercharged by a turbocharger mounted integrally with the gasifier case and having its axis perpendiclular to the plane containing the cylinder axes of the gasifier assembly. A centrifuagl compressor is utilized to supercharge the reciprocating compressors. Provision is made for intercooling the inlet air between the centrifugal and reciprocating compressor, and a single stage exhaust blowdown turbine is provided to drive the centrifgual compressor and the gasifier accessories. By locating the driving turbine as closely as possible to the gasifier exhaust ports, a large fraction of the available blowdown energy existing at the combustion chamber exhaust ports is captured and utilized. The reciprocating compressor inlet air density is increased substantially over that of an unsupercharged gasifier, permitting the diameter of the reciprocating compressors to be reduced with respect to the diameters of the power cylinders in the gasifier. This results in a substantial savings in overall machine diameter and, therefore, in power package bulk and weight since the compressor cylinder diameter dictates the overall diameter of a single cylinder machine and is a prime factor in the size of a siamesed gasifier. This also provides altitude power compensation since the free running turbocharger increases in speed with increase in altitude so as to maintain nearly constant power. It is also desirable to limit the peak power cylinder pressures to the range previously encountered in unsupercharged gasifiers with the result that the effective volumetric compression ratio of the power cylinder is reduced. This results in an increase in cylinder pressure and temperature at the beginning of the cylinder blowdown process which, in turn, increases the blowdown energy. It is, therefore, more important to utilize as much of this blowdown energy as possible than it is in unsupercharged gasifiers.

The relatively low ratio of compressor piston to power piston diameter severely limits the space available for synchronizing linkages and maneuvering cylinder controls to the extent that it is difficult to locate this equipment inside the gasifier case. It is, therefore, advantageous to circumvent this situation by using an external linkage system attached to the compressor piston assembly extending parallel to the axes of each of the gasifiers. This results in additional advantages including the elimination of valve plate seals and attendant oil leakage into the compressor and case, the provision of a convenient fuel injection pump drive, reduction of linkage movement by incorporating a reduction lever ratio to reduce the motion of the external links and thus reduce linkage inertia, and provision for an external piston latching device for starting which is under tension force thereby making the use of high pressure starting air unnecessary. It also permits a gasifier construction wherein the compressor pistons do not touch the cylinder walls directly, resulting in elimination of compressor bearing surfaces on the piston skirts. The overall configuration of the unit provides a lightweight, compact arrangement occupying less space and making the unit more competitive than gasifier units heretofore proposed.

The unit also includes a compact power turbine comprising a turbine which utilizes the turbine reduction gear box as a turbine support, thereby eliminating alignment problems. The preferred construction includes a multistage reaction turbine with an overhung rotor to eliminate the necessity of placing a high speed bearing on the high temperature side. The power turbine unit will require no cooling except for that required by bearing oil. It, therefore, may be operated continuously at stall with maximum gasifier output. This feature compares favorably with fluid torque converters now in common use which must have an elaborate cooling system and, even then, can operate at stall for only limited periods of time. In the event that supplemental power is required for short periods of time, an afterburner can be incorporated before the power turbine to boost the package power as much as 40 percent while increasing the overall package weight by a negligible amount. It is also possible to provide supplemental power for a drive other than the main power turbine drive by employing an auxiliary turbine which can be run in parallel on the excess gas volume flow resulting from afterburning. The unit has greater flexibility than diesel or other similar engine powered torque converter units since the power turbine may be located in numerous positions relative to the engine and does not depend on a direct mechanical drive therebetween. It obtains advantageous idle fuel consumption because of decrease in the turbocharger air flow speed and load. All of the power plant accessories may be driven directly by the engine, making it unnecessary to provide a separate unit for accessory drive purposes. Characteristic intake air pulsations are reduced by siamese operation when coupled with the use of a centrifugal compressor as a first stage of air compression.

In the drawings:

FIGURE 4 is a sectional view of one side of the gasifier as taken in the direction of arrows 4—4 of FIGURE 1, and having parts broken away;

FIGURE 5 is a sectional view of a portion of the turbocharger and accessory drive having parts broken away and taken in the direction of arrows 5—5 of FIGURE 3;

FIGURE 6 is a partial sectional view illustrating the exhaust blowdown turbine arrangement and taken in the direction of arrows 6—6 of FIGURE 3;

FIGURE 7 is a partial sectional view of the structure of FIGURE 6, and taken in the direction of arrows 7—7 of that figure; and FIGURE 8 is a cross-section view of that power turbine portion of the power package of FIGURE 1, with parts broken away.

The power package unit 10, generally illustrated in

Figure 1:
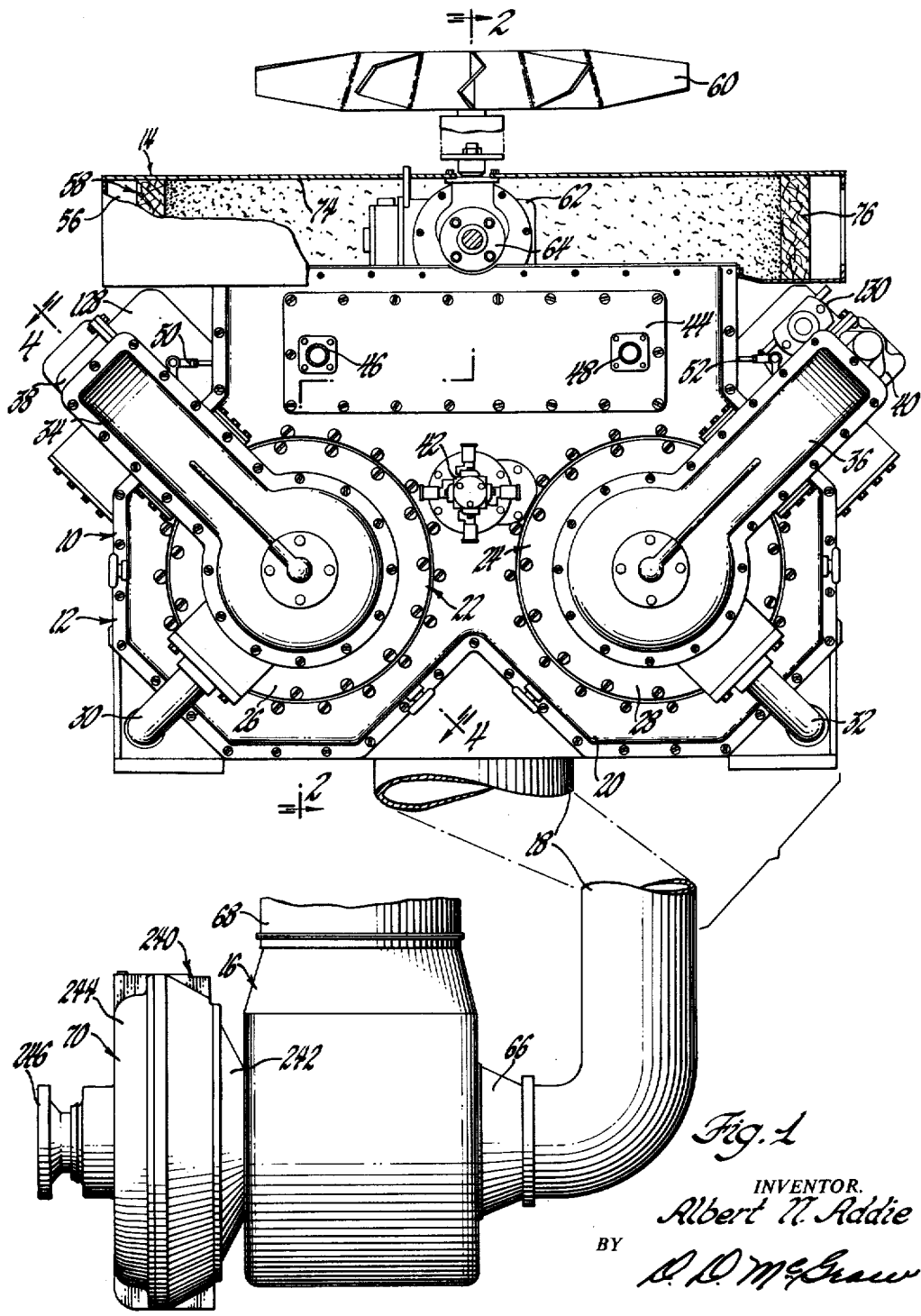
FIGURE 1 is an end view of a power package unit embodying the invention and having parts broken away and in section.

FIGURE 1, includes a gasifier section 12, an air inlet section 14 for the gasifier section and a power turbine section 16 connected with the gasifier section 12 by a duct 18.

The gasifier section 12 has a case 20 containing the siamesed opposed-piston gasifier units 22 and 24. The end of the gasifier section 12 has end covers 26 and 28 respectively provided for the gasifier units 22 and 24, balancing tubes 30 and 32 and synchronizing link end covers 34 and 36. Synchronizing link housings 38 and 40 are mounted exteriorly of the case 20 and enclose the synchronizing linkage systems for each of the gasifier units. The cylinder liner lubricating oil pumps 42 are mounted at either end of the case 20 as are the intercooler cover plates 44. One of these plates is provided with an appropriate water inlet 46 and a water outlet 48 through which cooling water is furnished to and removed from the intercooler mounted internally of the section. The throttle rack linkages 50 and 52 are also generally illustrated.

The air inlet section 14 includes an intake chamber 56 extending about the air inlet filter and silencer assembly 58. In some installations it may be preferable to provide a radiator cooling fan 60. This fan may be driven from the accessory drive assembly 62 which is shown in greater detail in FIGURE 5. A generator or other suitable drive 64 may also be provided as illustrated in FIGURE 1.

The duct 18 receives the gases discharged from the case 20 by the gasifier section and transmits these gases to the power turbine 16 through the turbine inlet 66. After the gases pass through the power turbine, more specifically illustrated in FIGURE 8, they are exhausted through the turbine exhaust duct 68. The reduction gearing 70 for the power turbine unit 16 is also generally illustrated in FIGURE 1, and the power output shaft 72 with flange 246 leads therefrom.

Figure 2:
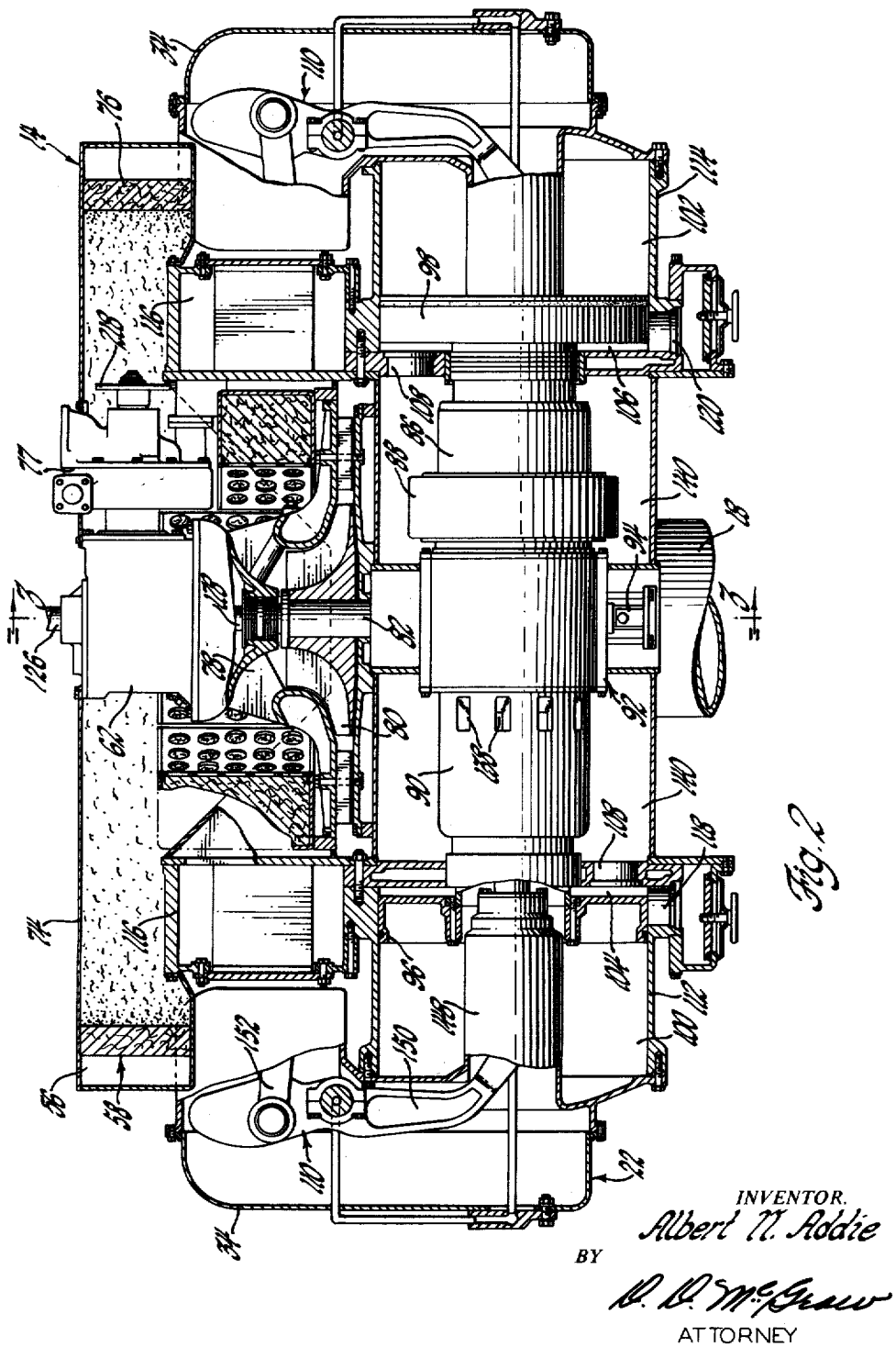
FIGURE 2 is a sectional view of the gasifier portion of the unit of FIGURE 1 taken in the direction of arrows 2—2 of that figure and having parts broken away and in section.

FIGURE 2 shows additional details of portions of the air inlet system 14 and some details of the reciprocable compressor assembly of the gasifier unit 22. A baffle plate 74 causes the air entering the intake chamber 56 to flow to the outer edges thereof where it passes through the filter 76 of the assembly 58. The upper end of the accessory drive assembly 62 is received through baffle plate 74 and may include the water pump 77. The accessory drive assembly 62 is mounted above the turbocharger compressor inlet 78 through which the inlet air is received from chamber 56. The turbocharger compressor 80 is mounted on a drive shaft 82 which is, in turn, driven by the exhaust blowdown turbine 84 illustrated in greater detail in FIGURES 3, 6 and 7.

The power cylinder exhaust liner 86 is provided with an exhaust collector 88 and is mounted within the case 20 so that its axis and, therefore, the axes of the power cylinders, are perpendicular to the axis of the drive shaft 82. The scavenging liner 90 is also mounted in case 20 in a similar manner and the liner center section 92 joins these two liners. The liner center section mounts a group of fuel injectors 94 for each of the gasifier units 22 and 24, three such injectors being illustrated for each unit as can best be seen in FIGURE 3. The gasifier discharge duct 18 is mounted immediately below the blowdown turbine assembly 84 and extends beyond the case 20. The reciprocating compressor pistons 96 and 98 for gasifier unit 22 are generally illustrated in FIGURE 2. They are received in bounce chambers 100 and 102 and separate those chambers from the compressor chambers 104 and 106. Case intake valves 108, which may be of the reed type, are also provided to interconnect compressor chambers 104 and 106 with the interior of case 20. Synchronizing linkage 110 for gasifier unit 22 is also provided exteriorly of the case 20 and the bounce chamber housings 112 and 114 and are covered by the synchronizing link end covers 34.

Inlet air from the turbocharger compressor 80 passes through the intercooler assembly 116 and into the compressor chambers 104 and 106 through compressor intake valves 118 and 120. Each compressor chamber is preferably provided with a plurality of these valves which may be of the reed type. In order to provide a compact unit, the intercooler assembly 116 is preferably mounted outward of the compressor assembly 80, and may extend into chamber 56, to provide sufficient intercooling structure. For this reason, the accessory drive 62 is also preferably mounted inside the intercooler and portions of the filter and silencing assembly structure.

Figure 3:
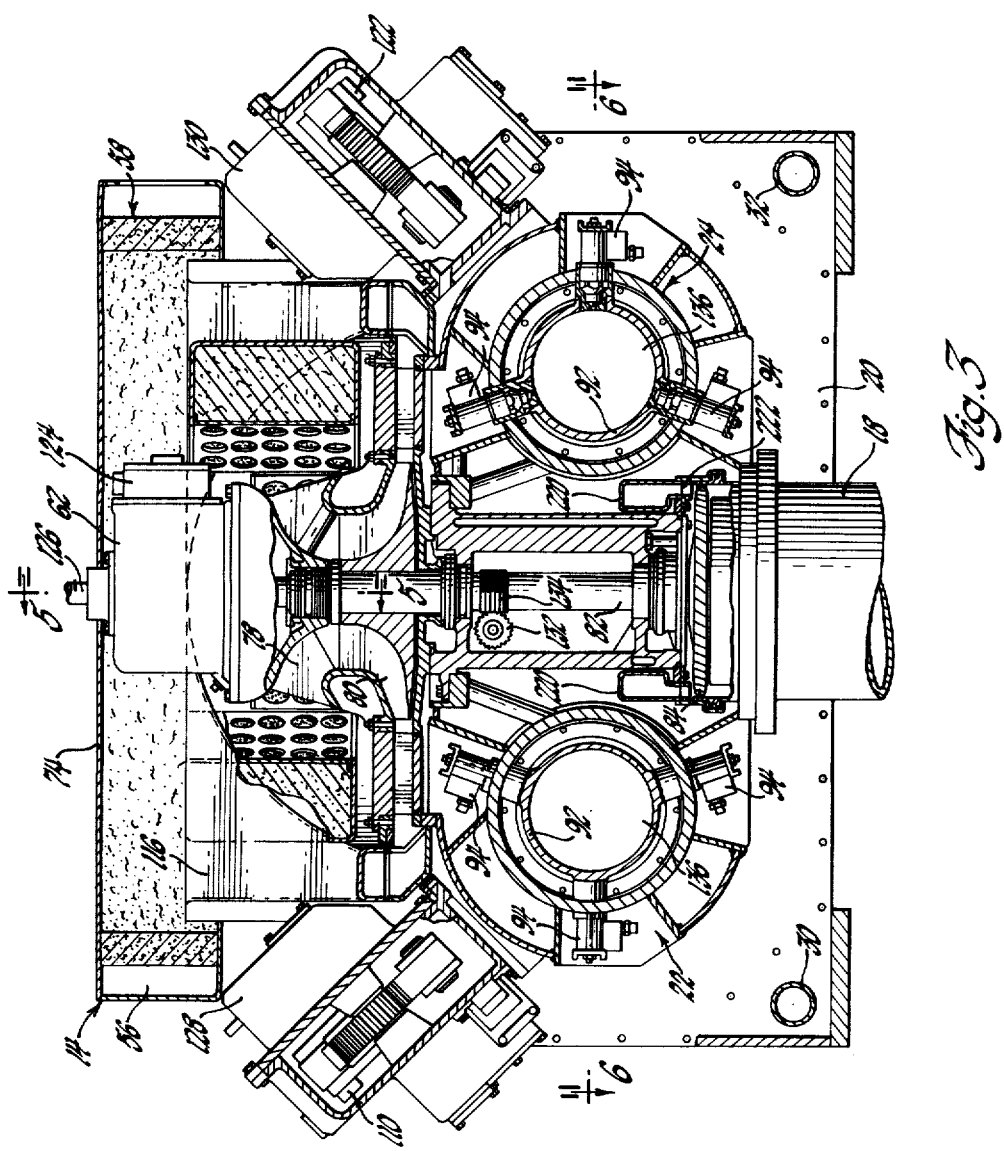
FIGURE 3 is a sectional view of the gasifier of FIGURE 1 taken in the direction of arrows 3—3 of FIGURE 2 and having parts broken away.

As is better seen in FIGURE 3, the turbocompressor drive shaft 82 extends intermediate the gasifier units 22 and 24 with the compressor 80 being positioned immediately above those units and the blowdown turbine 84 immediately below those units, thereby occupying available space in a siamesed gasifier section somewhat in the manner of a dumbbell. This further contributes to the compact arrangement of the unit 10 and also locates the compressor 80 and the turbine 84 in the most advantageous positions in relation to the gasifiers. FIGURE 3 also illustrates the compactness of the unit 10 wherein the intercooler 116 is mounted intermediate the synchronizing links 110 for gasifier unit 22 and synchronizing links 122 for gasifier unit 24. As noted above, these synchronizing links are mounted exteriorly of case 20. They are perferably arranged at approximately 45 degree angles to the axis of shaft 82, as viewed in FIGURE 3, and extend along their respective gasifier units in parallel relation to the axes of those units. The accessory drive 62 shows the scavenge pump 124 as a portion thereof when seen in FIGURE 3, and further indicates the relationship of that drive unit to the air inlet system 14. The shaft 126 may provide the drive for the radiator cooling fan 60. In addition to providing the drive 64 for the generator and the drives for the scavenge pump 124 and water pump 76, the accessory drive 62 may drive the piston cooling oil pump and the control oil pump, as well as providing an alternate drive for the radiator cooling fan and other desirable accessories.

The fuel injection pumps 128 and 130 are driven by their respective synchronizing links 110 and 122. The cylinder liner lubricating oil pump 42 may have a driven gear 132 driven by a worm 134 on shaft 82. It is, therefore, noted that all of the necessary accessories for operation of the gasifier assembly 12 are driven directly by the gasifier assembly either through shaft 82 or the synchronizing links 110 and 122. This eliminates the necessity for the auxiliary power system commonly utilized in previous free piston engine installations.

FIGURE 4 shows additional details of the synchronizing linkage 110 for the gasifier unit 22, as well as other related features. The liner center section 92 includes the portion 135 of the power cylinder in which the combustion chamber 136 is centered. Scavenging liner 90 has a series of scavenging ports 138 connecting the scavenge chamber 140 of case 20 with the combustion chamber 136 when the power piston 142 is in its outer position illustrated in FIGURE 4. At the same time, power piston 144 is in its outer position so that exhaust ports 146 of exhaust liner 86 are connected to the exhaust collector 88. Power pistons 142 and 144 are centrally supported on supports 148. These supports are provided as integral parts of the end covers 26 and 28.

The synchronizing linkage 110 includes a pivoted link 150 actuated by movement of the power piston 142 to move link 152 at approximately half the stroke of the power piston. This link is, in turn, connected to arcuately rotating gear sector 154 which meshes with a similar gear sector 156 driven by the other portion of the synchronizing linkage 110 of gasifier unit 22. The fuel pump linkage system 158 is driven by synchronizing linkage 110 through cam 160. Linkage 158 causes reciprocating movement of the fuel pump drive 162 against the force of spring 163. The synchronizing linkage system for each of the gasifier units 22 and 24 also includes a low pressure start locking system and a maneuvering system wherein the synchronizing links are actuated by air to move the power pistons to their extreme outward positions and then locked in place. The locking cylinder 164 actuates retaining arm 166 to position the roller 168 in the detent 170 of gear sector 156. Compressed air from a low pressure source, 45 p.s.i.g. for example, is then supplied to the bounce chambers at either end of the gasifier units but the compressor and power pistons do not move because of the locked condition. Cylinder 164 may be interconnected with the air supply system so that it is released when the bounce chambers are sufficiently pressurized for starting purposes. Roller 168 then moves against the head 172 of shock absorber 174 and a latch 176 is provided for holding the end of retaining arm 166 away from the gear sector 156 so that it does not interfere with operation of the engine when the engine is started.

FIGURE 5 illustrates the accessory drive in greater detail. The drive shaft 82 has the compressor 80 attached thereto, and immediately above the compressor is provided a shaft extension 178 attached to the upper end of shaft 82 by suitable means such as bolt 180. A portion of shaft extension 178 extending through the boss 182 of the accessory drive housing 184 is formed to provide a labyrinth seal 186 and has a flange 188 overlapping and extending downwardly beyond the inner end 190 of boss 182 to prevent the loss of lubricating oil through the compressor. Shaft extension 178 terminates in the sun gear 192 of gear reducer 194. The ring gear 196 is secured to housing 184 and the output of the gear reducer 194 is provided by the carrier 198. Suitable planetary gears 200 mesh with sun gear 192 and ring gear 196 to complete the drive. A stub shaft 202 attached to planetary carrier 198 provides a drive for bevel gear 204, oil pump drive shaft 206 and the drive shaft 126 to fan 60. Oil pump 208 may provide oil for the turbine bearings and cooling oil for the gasifier pistons. It may also provide control oil pressure, if desired, although a separate pump is preferred for this purpose in order to obtain closer control of the engine. Bevel gear 204 meshes with another bevel gear 210 to provide an angled drive for shaft 212. The cooling water pump impeller 214 of water pump 76 is mounted on the shaft in the water pump housing 216. Shaft 212 may extend through housing 216 and have a flange 218 mounted thereon for a generator drive or a drive for other suitable accessories. The oil scavenge pump 124, illustrated in FIGURE 3, may also be driven off bevel gear 204.

FIGURES 6 and 7 show the relationship of the exhaust blowdown turbine 84 to the gasifier combustion chamber exhausts. The exhaust collectors 88 to which the exhaust gases are delivered through exhaust ports 146 are connected with exhaust gas scrolls 220. These scrolls conduct the gases to the nozzle 222. The gases then pass through the turbine 84 to drive that turbine and shaft 82. The exhaust gases passing out of turbine 84 are conducted to the exhaust duct 18. Since these gases are mixed with a high proportion of pressurized air used for scavenging purposes, the gas temperature at turbine 84 is sufficiently low to provide long turbine life without the necessity of using expensive metals normally required for high temperature turbine installations.

The gases passing through exhaust duct 18 enter the turbine inlet 66 and are conducted through the multistage turbine elements 228 to the turbine exhaust 68. The turbine elements 228 are connected to drive shaft 230 leading into the gear reducer 70. The gear reducer 70 is illustrated as comprising a driving sun gear 232, planetary gears 234 mounted on output carrier 236, and a reaction ring gear 238 which is anchored to the gear reducer case 240. The turbine elements 228 are arranged in overhung relation on shaft 230 and this shaft is journaled in bearings supported by housing 242 which forms a part of the case 240. The gear reducer cover 244 has suitable bearings for the output shaft 72 driven by the carrier 236. A drive flange 246 may be provided on the end of shaft 72 to transmit power to a vehicle drive system or other suitable mechanism.

In operation, air is drawn through the filter and silencer assembly 58 and compressed to approximately two atmospheres by the centrifugal compressor 80. The air flow then passes through the intercooler assembly 116 through which cooling water is circulated by pump 76. Considering the power package to have approximately 600 shaft horsepower at the output shaft 72, it is found desirable to cool the air at this point to approximately 175° F. The reciprocating compressors of the gasifier units 22 and 24 direct air to the case chamber 140, which is common to both gasifier units 22 and 24, at approximately six atmospheres pressure and 450° F. By siamesing the units, cross scavenging is obtained wherein air from one gasifier unit is used to scavenge the power cylinder of the other unit while the power cylinders are operating with approximately at 180° phase angle. The gases discharged from the compressor chambers 104 and 106 have a considerable pulse energy available and part of this energy, together with the necessary amount of pressure energy, is converted by the turbine 84 into mechanical work to drive the supercharging compressor 80 and the accessory drive system 62. The turbocharger drive and driven units are integrally connected with the gasifier case 20 to provide a compact arrangement and to make possible full utilization of cylinder blowdown energy of the turbine 84. It can thus be seen that the power package disclosed obtains the desired advantages and will permit a free piston engine system to be competitive with currently manufactured diesel engines while retaining advantages peculiar to free piston engines.

I claim:

1. A free piston engine power package comprising a pair of parallel opposed piston siamesed gasifiers, a gasifier exhaust blowdown driven turbine mounted between said pair of gasifiers and juxtaposed to the combustion chamber exhaust therefrom and driven by exhaust gases from said gasifiers, a shaft driven by said turbine extending perpendicular to and through a plane containing the piston axes of said gasifiers, a gasifier air inlet compressor drivingly connected with said shaft and intermediate said pair of gasifiers on the opposite side of the gasifier piston axes plane from said turbine, inlet air intercooler means positioned outward of said compressor and receiving engine inlet air therefrom for cooling the air received, an accessory drive mechanism drivingly connected with said shaft immediately adjacent said compressor and having accessory means attached thereto and driven thereby, air inlet filter means spaced outwardly beyond said compressor and accessory drive means, and radiator cooling fan means driven by said accessory drive means.

2. The power package of claim 1, said pair of gasifiers each having synchronizing links extending substantially parallel to the gasifier piston axis associated therewith and further extending upwardly and outwardly therefrom whereby said compressor and intercooler means are received therebetween.

3. The power package of claim 1, said gasifiers having a common case receiving the combustion gases and compressed air therefrom, duct means for conducting the combustion gases and compressed air outwardly of said case, and a power turbine driven by said gases to provide the primary engine power.

4. A siamesed gasifier free piston engine power package having a pair of spaced and parallel and opposed-piston gasifiers, the piston axes of said gasifiers defining a gasifier axis plane, turbocharger drive means including a turbine driven by combustion chamber exhaust blowdown of said gasifiers and driving a shaft drivingly connected to a compressor supplying air to said gasifiers and to an accessory drive train, said turbine being on one side of said gasifier axis plane and said drive shaft extending perpendicularly therethrough between said gasifiers and said compressor and accessory drive train being on the other side of said gasifier axis plane, said turbine and compressor each being located adjacent the paired gasifiers.

5. A siamesed gasifier free piston engine power package having a pair of spaced and parallel and opposed-piston gasifiers, the piston axes of said gasifiers defining a gasifier axis plane, turbocharger drive means including a turbine driven by combustion chamber exhaust blowdown of said gasifiers and driving a shaft drivingly connected to a compressor supplying air to said gasifiers, said turbine being on one side of said gasifier axis plane and said drive shaft extending perpendicularly therethrough between said gasifiers and said compressor being on the other side of said gasifier axis plane, said turbine and compressor each being located adjacent the paired gasifiers.

References Cited in the file of this patent

UNITED STATES PATENTS

| | | |
|---|---|---|
| 2,464,434 | Chittenden | Mar. 15, 1949 |
| 2,581,600 | Pateras Pescara | Jan 8, 1952 |
| 2,795,927 | Huber | June 18, 1957 |
| 2,928,584 | Foster | Mar. 15, 1960 |

FOREIGN PATENTS

| | | |
|---|---|---|
| 467,561 | Great Britain | June 14, 1937 |

UNITED STATES PATENT OFFICE
CERTIFICATE OF CORRECTION

Patent No. 3,112,607　　　　　　　　　　　　December 3, 1963

Albert N. Addie

It is hereby certified that error appears in the above numbered patent requiring correction and that the said Letters Patent should read as corrected below.

Column 1, line 11, for "power turbine" read -- turbocharger --; line 12, for "turboconverter" read -- power turbine --; line 19, strike out "a"; lines 27 and 28, for "perpendiclular" read -- perpendicular --; line 29, for "centrifuagl" read -- centrifugal --; same column 1, line 33, for "centrifgual" read -- centrifugal --; column 2, line 39, after "flow" insert -- with --; line 69, for "that" read -- the --; column 6, line 18, for "at" read -- a --; line 28, for "of" read -- by --.

Signed and sealed this 30th day of June 1964.

(SEAL)
Attest:

ERNEST W. SWIDER　　　　　　　　　　　　EDWARD J. BRENNER
Attesting Officer　　　　　　　　　　　　　Commissioner of Patents